(12) United States Patent
Vassen et al.

(10) Patent No.: US 7,582,374 B2
(45) Date of Patent: Sep. 1, 2009

(54) METHOD FOR PRODUCING A LAYER SYSTEM COMPRISING A METALLIC CARRIER AND AN ANODE FUNCTIONAL LAYER

(75) Inventors: Robert Vassen, Herzogenrath (DE); Dag Hathiramani, Jülich (DE); Hans Peter Buchkremer, Heinsberg (DE); Frank Tietz, Jülich (DE); Jens-Erich Döring, Dormagen (DE); Roberto Siegert, Jülich (DE); Franziska Traeger, Jülich (DE); Detlev Stöver, Nierderzier (DE)

(73) Assignee: Forschungszentrum Julich GmbH, Julich (DE)

( * ) Notice: Subject to any disclaimer, the term of this patent is extended or adjusted under 35 U.S.C. 154(b) by 13 days.

(21) Appl. No.: 10/548,617

(22) PCT Filed: Feb. 6, 2004

(86) PCT No.: PCT/DE2004/000198

§ 371 (c)(1),
(2), (4) Date: May 17, 2006

(87) PCT Pub. No.: WO2004/079033

PCT Pub. Date: Sep. 16, 2004

(65) Prior Publication Data

US 2007/0042112 A1    Feb. 22, 2007

(30) Foreign Application Priority Data

Mar. 7, 2003 (DE) ................ 103 09 968

(51) Int. Cl.
*H01M 8/10* (2006.01)
(52) U.S. Cl. ........................................ 429/30; 429/33
(58) Field of Classification Search ................ 427/115; 29/623.1–623.5
See application file for complete search history.

(56) References Cited

U.S. PATENT DOCUMENTS

| | | | | |
|---|---|---|---|---|
| 4,490,444 A | * | 12/1984 | Isenberg | 429/31 |
| 4,759,957 A | * | 7/1988 | Eaton et al. | 427/226 |
| 5,138,461 A | * | 8/1992 | Kawamura et al. | 348/822 |
| 5,766,693 A | * | 6/1998 | Rao | 427/454 |
| 6,979,511 B2 | * | 12/2005 | Visco et al. | 429/30 |
| 2002/0081762 A1 | * | 6/2002 | Jacobson et al. | 438/32 |
| 2002/0164523 A1 | * | 11/2002 | Shibata et al. | 429/44 |
| 2002/0179887 A1 | * | 12/2002 | Zeng et al. | 252/373 |
| 2003/0082423 A1 | * | 5/2003 | Kushibiki et al. | 429/26 |
| 2003/0224232 A1 | * | 12/2003 | Browall et al. | 429/30 |
| 2004/0018409 A1 | * | 1/2004 | Hui et al. | 429/33 |
| 2004/0185310 A1 | * | 9/2004 | Jenson et al. | 429/7 |

FOREIGN PATENT DOCUMENTS

| | | |
|---|---|---|
| DE | 42 28 779 | 3/1994 |
| EP | 0 545 695 | 6/1993 |
| EP | 0 794 265 | 9/1997 |
| EP | 1 261 059 | 11/2002 |
| GB | 2 016 361 | 9/1979 |

OTHER PUBLICATIONS

Callister, William D, Jr., Materials Science and Engineering, 1997, John Wiley and Sons INC., 4th edition, p. 789.*

* cited by examiner

*Primary Examiner*—Dah-Wei D Yuan
*Assistant Examiner*—Maria J Laios
(74) *Attorney, Agent, or Firm*—Andrew Wilford

(57) ABSTRACT

The aim of the invention is to produce complete high temperature fuel cells by means of thermal injection processes (e.g. atmospheric plasma injection, vacuum plasma injection, high speed flame injection). The production method is especially simplified and is economical by virtue of the fact that the carrier substrate is also produced on a base with the aid of a thermal injection method. The base or an intermediate layer placed thereon can be advantageously dissolved or decomposed such that the carrier substrate provided with layers arranged thereon can be separated in a very simple manner from the base which becomes unnecessary. Said method advantageously enables the production of all layers of a high temperature fuel cell, exclusively with the aid of a thermal injection method.

28 Claims, 2 Drawing Sheets

Figure 1:
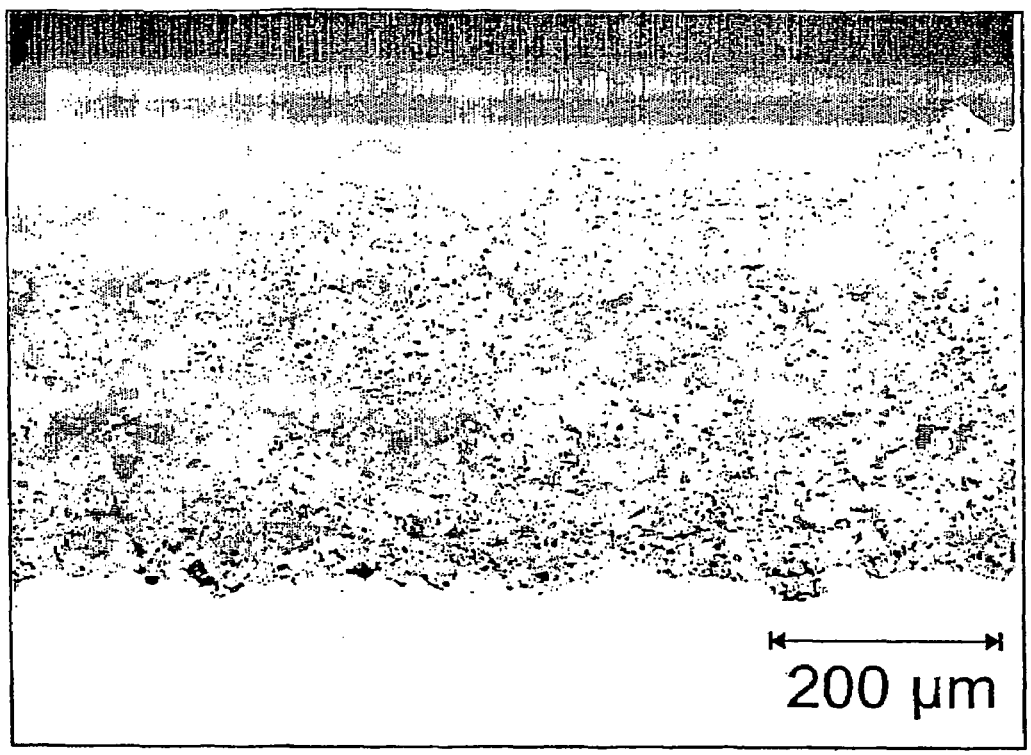

METHOD FOR PRODUCING A LAYER SYSTEM COMPRISING A METALLIC CARRIER AND AN ANODE FUNCTIONAL LAYER

CROSS REFERENCE TO RELATED APPLICATIONS

This application is the US national phase of PCT application PCT/DE2004/000198 filed 6 Feb. 2004 with a claim to the priority of German patent application 10309968.9 itself filed 7 Mar. 2003, whose entire disclosures are herewith incorporated by reference.

FIELD OF THE INVENTION

The invention relates to a method of making a layer system, especially for producing a layer system comprising at least one metallic carrier and an anode functional layer. Such a layer system is generally used in high temperature fuel cells.

STATE OF THE ART

For producing individual components for a high-temperature fuel cell, various methods have been found to be suitable. Among these methods are, among others, atmospheric plasma spraying, vacuum plasma spraying and high speed flame spraying. The plasma spraying is a modern technique for providing surfaces of components with coatings having special characteristics. As carriers for the coatings (substrates) a relatively large number of materials can be used. In the production of the coatings, powder-form or pulverulent] particles are melted in a hot plasma beam, accelerated and sprayed therewith onto the substrate surface. There the molten material solidifies and remains adherent. By the repeated application of particles, also layers of greater thickness can be built up.

A problem with the use of thermal spray processes for the production of individual fuel cell components is that one must use a carrier in the form of a substrate for the coating. For that purpose up to now as a rule, skeletons of metallic fibers or metallic felts or porous powder metallurgically made plates have been used. On these structures (carriers), a first functional layer, for example the anode, is applied.

The disadvantages here to be mentioned are the high cost of the substrate and an expensive fabrication technique.

Substrates which are made by powder technology shaping methods of composite materials like Ni/YSZ (Yttrium oxide stabilized zirconium oxide) or NiO/YSZ, have the drawback that they are not very stable mechanically. In the production of such a layer system for a high-temperature fuel cell by thermal spray methods, generally excessive temperature fluctuations arise which can produce enormous thermal stresses, in the substrate leading to the rupture thereof.

Additional problems which arise with carrier substrates which have been used for some time up to now have been associated with the relatively large porosity resulting usually from plasma spraying. This can lead to a disadvantageously insufficient electrochemical efficiency of the fuel cell.

OBJECTS

An object of the invention is to provide a suitable carrier substrate, especially for the production of fuel cell components. A further object of the invention is to provide an economical and simple method for making available such carrier substrates.

The objects of the invention are achieved in a method with the totality of the features of the main claim. Advantageous features of the method are found in the dependent claims relating thereto.

SUMMARY OF THE INVENTION

The concept upon which this invention is based is that not only can the individual functional layers of a high-temperature fuel cell be made advantageously with the aid of plasma spraying but that also the carrier substrate required can be made in this manner as well.

With the method according to the invention described here, advantageously the suitable substrate, referred to in the following as a carrier structure, is made directly by means of a thermal spray process. For producing this carrier structure, a suitable metal powder is sprayed onto a surface by a thermal spray process. Preferably this surface is provided with an easily removable coating (separating layer or parting layer). This removable parting layer enables in a simple manner the release of the carrier substrate after the coating process from the surface. It can for example be formed by a plastic coating which can be applied by an immersion or dipping process or by a spray process. The removal or separation of the substrate or carrier from the surface can then be effected thermally in that case. A parting layer or coating can however also be formed by a salt layer upon for example the drying of a solution or also deposited by a thermal spray method. In such case the parting layer can be removed by a suitable solution (for example water). Alternatively, the carrier structure can be removed from its substrate by mechanical machining (sawing or peeling or levering it off).

The carrier structure itself is produced by spraying a metal powder which can have the following characteristics especially for producing fuel cell components. It should advantageously have a thermal coefficient of expansion which is matched to that of the usual fuel cell components, which is about $10 \times 10^{-6}/K$ to $13 \times 10^{-6}/K$. In addition, it should at elevated temperatures and under oxidizing conditions be capable of forming an oxide skin on its surface which is electrically conductive. Preferably for this purpose ferritic steels which form chromium oxide cover layers or manganese oxide cover layers are used. Alternatively, chromium based alloys, for example of a CrFeY-basis can find application for this purpose. The carrier structure should have a high open porosity (especially greater than 15%) so as not to create an excessive resistance to the gas transport. Corresponding porosities can be easily produced by the thermal coating. Preferably relatively coarse powder (particle size >50 μm) can be used as previously has been employed with cold spray techniques, that is with only partial melting of the metal particles. An additional increase in porosity can be achieved by including organic components for example (polyesters) or carbon or other suitable place holders during the thermal spraying. These organic components or place holders can be easily subsequently removed by a thermal treatment. Effective layer thicknesses for the carrier structure are especially between 0.3 mm and 3 mm.

After the deposition of the carrier structure on a substrate, the carrier structure is coated with an anode functional layer, for example, of a fully stabilized zirconium oxide (YSZ) with a nickel or nickel oxide addition, with the aid of a thermal spray coating process. The weight ratio of YSZ and nickel or nickel oxide should advantageously lie at about 50%/50%. An especially fine porosity can be obtained by the use of a suspension as a starting material for the thermal spraying (thermal suspension spraying). In this manner, the material which is applied (for example 8YSZ/NiO) can be deposited as a powder with a relatively small particle size (<1 μm) by the spray process. A preferred coating thickness lies between 5 and 50 μm.

Thereafter, the anode functional layer can be optionally provided by a thermal spray process with a dense electrolyte. Preferred materials for a suitable electrolyte are also here fully stabilized zirconium oxides (for example YSZ). The density of the electrolyte is established by the use of suitable spray parameters. What is important in this case is also the use of a high substrate temperature (T>200° C.), and generally the hottest possible spray parameter, that is a spray parameter which will result in the greatest degree possible of melting of the particles, and the highest possible coating thickness per pass (greater than 5 μm), since these parameters are effective to avoid micro cracks and thus enable a dense coating deposition. In any case, the parameters should be so selected that segmenting cracks as arise a rule with high coating thicknesses, will be precluded. The metallic carrier substrate offers the advantage, by comparison with conventional anode substrates on an NiO/YSZ basis and also generally by comparison with ceramic materials, that it can be thermally loaded to a greater extent and thus the requisite hot spray conditions can be used therewith. In case the porosity of the electrolyte layer should be reduced still further an after treatment of the coating is possible. Alternatively, here as well the thermal suspension spray can be used since the fine particles employed with suitable processing enables a dense layer deposition. The layer thicknesses lie in the range between 5 μm and 100 μm.

As further, optional layers, layers can be deposited by thermal spraying which can include a cathode functional layer, for example a mixture of a perovskite (for example $La_{0.65}Sr_{0.3}MnO_3$ or an La/Sr/Fe/Co based perovskite with YSZ). As typical layer thicknesses here, thicknesses between 5 and 50 μm can be mentioned. Here as well, fine porous structures can be produced by thermal suspension spraying.

As a final layer for a high-temperature fuel cell, optionally the cathode of perovskite (for example $La_{0.65}Sr_{0.3}NnO_3$) can be applied by a thermal spray process.

In this case, like with the formation of the carrier substrate, primarily coarse powder (greater than 50 μm) is used with cold spray parameters. Here as well the use of organic components to increase the porosity is possible.

SPECIFIC DESCRIPTION

In the following, the subject matter of the invention is described based upon three figures and an exemplary embodiment in greater detail without thereby limiting the scope of the invention thereto. They show:

FIG. 1: an image of the carrier layer formed by plasma spraying from a ferritic steel with or porosity of about 22%.

Figure 2:
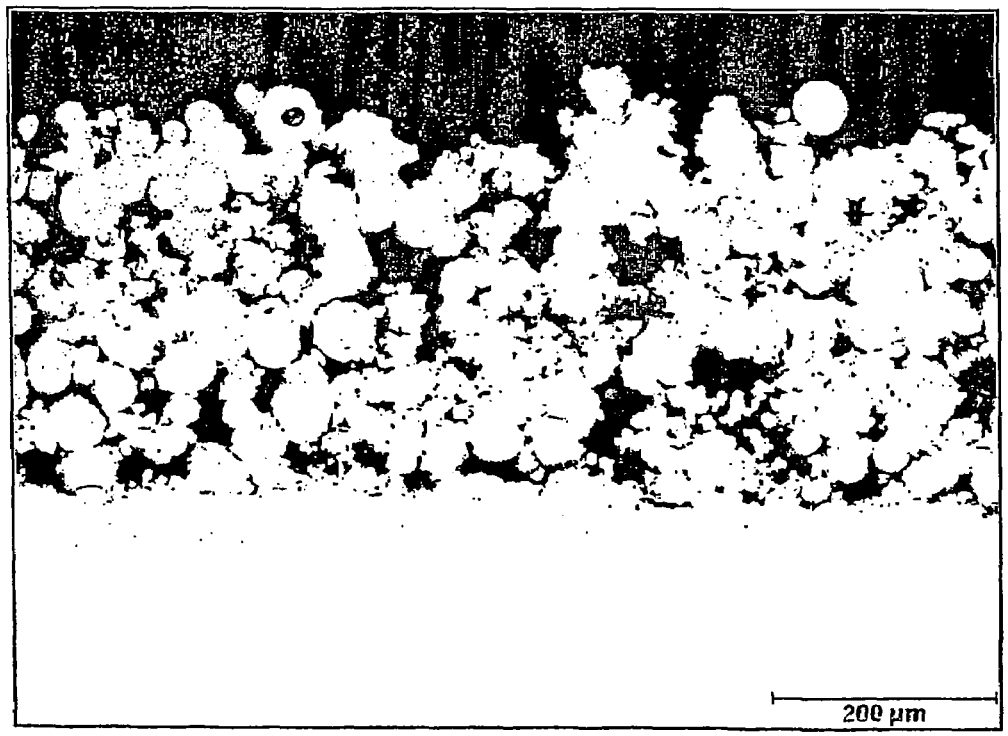

FIG. 2: an image of a carrier layer formed by atmospheric plasma spraying with the addition of polyester and wherein the carrier layer is formed from zirconium oxide with a porosity of about 33%.

Figure 3:
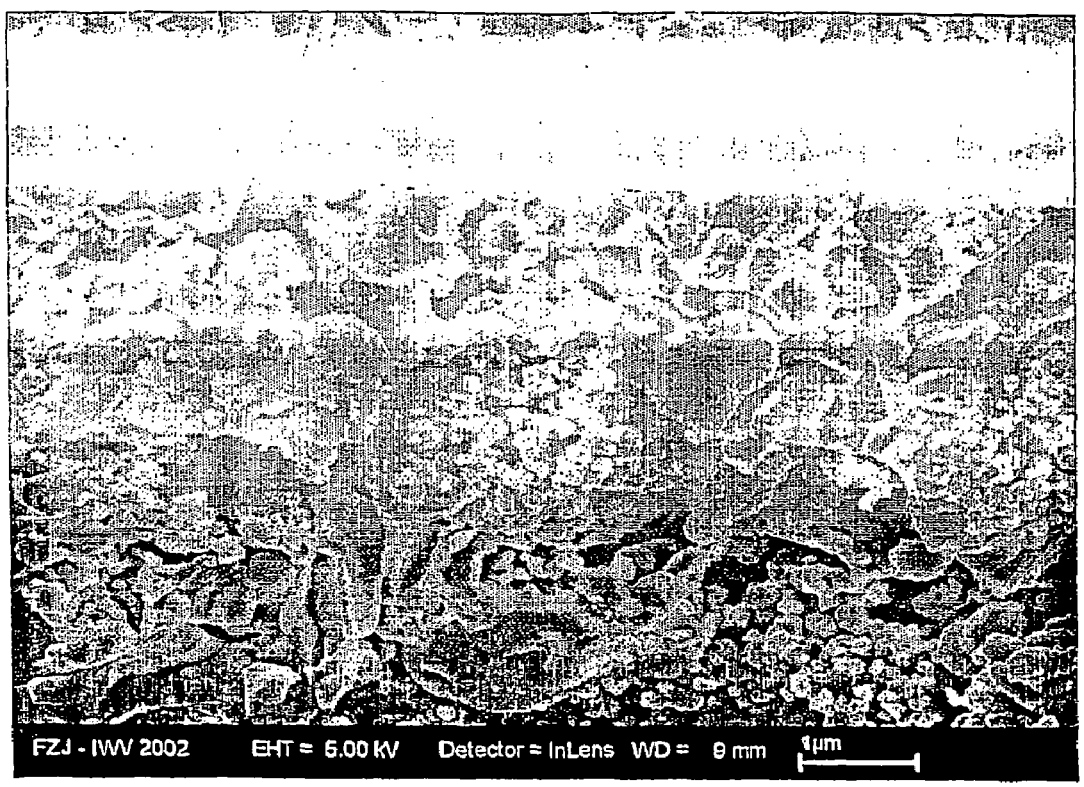

FIG. 3: an image of a fine porous layer of fully stabilized zirconium oxide (YSZ) produced by suspension plasma spraying.

SPECIFIC DESCRIPTION

By atmospheric plasma spraying with an F4 burner, a Cr5FeY alloy is deposited on a polymer coated ST37 steel substrate. As an organic additive component to the spray, polyester is used. The use of cold process parameters (power about 40 kW, 120 mm spray spacing) in combination with the polyester additive, enables a setting of a porosity of significantly above 30% following the burn off of the polyester. The layer thickness amounted to about 1 mm.

Upon this layer, using atmospheric suspension plasma spraying a fine-porous coating (Porosity >25%) of 55% NiO/45% YSZ was deposited. The solids content of the suspension was about 25 weight %. The spray distance amounted to 70 mm with a power of the F4 burner of 47 kw.

The electrolyte coating was deposited subsequently with the aid of atmospheric plasma spraying with the use of fine grain molten broken YSZ powder. The substrate temperature amounted at that point to about 350° C. The burner power was 50 kW, the spray distance 80 mm the layer thickness which was established was 50 μm.

Thereafter, using atmospheric suspension plasma spray, a cathode functional layer was deposited as a finely porous layer (Porosity >25%). The suspension used was comprised of $La_{0.65}Sr_{0.3}MnO_3$/YSZ with a solids content of about 25 weight percent. The layer thickness was 30 μm. The spray distance amounted to 70 mm with a power of the F4 burner of 47 kw.

The last layer was again applied by atmospheric plasma spraying with an addition of polyester powder. Cold spray parameters were used in combination with polyester which could be burned out to a porosity of greater than 30%. The polyester powder was injected through a separate injector into a relatively cold region of the plasma flame to avoid burnoff in the plasma. The latter thickness amounted to 50 μm.

As a final method step, the layer system is maintained at 600° C. in air to release the layer system from the substrate and to remove the polyester. Alternatively, the burnoff of the polyester can be carried out at start up of the fuel cell.

The invention claimed is:

1. A method of making a layer system comprising at least one metallic carrier and an anode functional layer, the method comprising the steps of sequentially:
   spraying a ferritic-steel or chromium-alloy metal powder upon a substrate with the aid of a thermal spray process to form a porous metallic carrier layer on the substrate,
   applying to the carrier layer a further component as an anode functional layer with the aid of a thermal spray process to form a layer system comprised of the carrier layer and the anode functional layer, and
   separating the layer system from the substrate.

2. The method according to claim 1, further comprising the step of
   prior to the application of the carrier layer, coating the substrate with an intermediate layer, the layer system being separated from the substrate by the removal or dissolution of the intermediate layer.

3. The method according to claim 2 in which as the substrate or intermediate layer a plastic layer is selected that thermally decomposes at a temperature above 300° C. to release the layer suspension.

4. The method according to claim 2 in which a salt layer is selected as the substrate or intermediate layer, the layer system being separated from the carrier layer by dissolution of the salt layer with a solvent.

5. The method according to claim 1 in which the layer system is separated from the carrier layer by mechanical machining.

6. The method according to claim 1 in which the metal powder used for the carrier layer has a thermal expansion coefficient between $10 \times 10^{-6}$/K and $13 \times 10^{-6}$/K.

7. The method according to claim 1 in which the carrier layer has a porosity in excess of 15%.

8. The method according to claim 1 wherein in addition to the metal powder at least one further organic powder is used to form the carrier layer.

9. The method according to the claim 8 in which in addition to the metal powder, polyester or carbon is used as the further organic component of the carrier layer.

10. The method according to claim 8 in which, after formation of the carrier layer, the further organic component is thermally removed at least to the greatest possible extent.

11. The method according to claim 1 in which, as further components for the formation of the anode functional layer, fully stabilized zirconium oxide and nickel or nickel oxide are used.

12. The method according to claim 11 in which the fully stabilized zirconium oxide and nickel or nickel oxide has a grain size less than 5 μm.

13. The method according to claim 1 in which the anode functional layer is applied with the aid of a thermal suspension spray process.

14. The method according to claim 1, further comprising the step of
with the aid of a thermal spray process applying an electrolyte layer on the anode functional layer.

15. The method according to claim 14 in which fully stabilized zirconium oxide is used for the electrolyte layer.

16. The method according to claim 14 in which during the application of the electrolyte layer temperatures above 180° C. are used.

17. The method according to claim 14 in which the electrolyte layer is applied with a thickness of at least 5 μm.

18. The method according to claim 14 in which the electrolyte layer is applied with the aid of a thermal suspension spray method.

19. The method according to claim 14, further comprising the step of
applying a cathode functional layer to the electrolyte layer as a fourth layer with the aid of a thermal spray method.

20. The method according to claim 19 in which a mixture of a perovskite and fully stabilized zirconium oxide is used for the cathode functional layer.

21. The method according to claim 19 in which the cathode functional layer is applied with a layer thickness of at least 5 μm.

22. The method according to claim 19 in which the cathode functional layer is applied with the aid of a thermal suspension spray method.

23. The method according to claim 19, further comprising the step of
applying a fifth layer to the cathode functional layer with the aid of a thermal spray method.

24. The method according to claim 23 in which at least one perovskite is used for the fifth layer.

25. The method according to claim 23 in which the fifth layer is a perovskite powder having a grain size greater than 50 μm.

26. The method according to claim 25 in which apart from the perovskite powder at least one further organic component is used to form the fifth layer.

27. The method according to claim 1 for producing a high temperature fuel cell comprising an anode functional layer, an electrolyte layer arranged thereon, a cathode function layer as well as a further layer arranged on the cathode function layer.

28. A method of making a layer system comprising at least one metallic carrier and an anode functional layer, the method comprising the steps of sequentially:
spraying a ferritic-steel or chromium-alloy metal powder upon a substrate with the aid of a thermal spray process to form a porous metallic carrier layer on the substrate,
applying to the carrier layer fully stabilized zirconium oxide and nickel or nickel oxide as an anode functional layer with the aid of a thermal spray process to form a layer system comprised of the carrier layer and the anode functional layer, and
separating the layer system from the substrate.

\* \* \* \* \*